March 31, 1970     E. W. BALKE     3,503,471

MONORAIL BRAKE SYSTEM

Filed April 3, 1968     2 Sheets-Sheet 1

INVENTOR.
EARL W. BALKE
BY
Meyer, Tilberry & Body
ATTORNEYS.

March 31, 1970  E. W. BALKE  3,503,471
MONORAIL BRAKE SYSTEM
Filed April 3, 1968  2 Sheets-Sheet 2

INVENTOR.
EARL W. BALKE
BY
Meyer, Tilberry & Body
ATTORNEYS.

United States Patent Office 3,503,471
Patented Mar. 31, 1970

3,503,471
MONORAIL BRAKE SYSTEM
Earl W. Balke, Mentor Lake, Ohio, assignor to Eaton Yale & Towne Inc., a corporation of Ohio
Filed Apr. 3, 1968, Ser. No. 718,582
Int. Cl. B61h *13/00;* B61k *7/00*
U.S. Cl. 188—57                                    8 Claims

ABSTRACT OF THE DISCLOSURE

A brake system for article transporting equipment, and particularly for a overhead monorail assembly, wherein a long brake shoe approximately parallel to the assembly rail is pivotally attached to the assembly rail at one end of the shoe, and a braking force is applied near the other end of the shoe designed to force the shoe against a surface of the trolley moving past the shoe. Application of the braking force is by means of a movement multiplying linkage and dash-pot connected to the linkage, which together prevent chattering of the brake shoe during use, and provide a brake system which is simpler and more effective than those heretofore used.

---

The present invention relates to a brake system for article transporting equipment, and in particular to such a system for an overhead monorail assembly.

In a monorail assembly, a trolley normally is suspended from an overhead rail and is provided with wheels which engage the rail for travel therealong. It is known to provide a brake system for such an assembly consisting of one or more long brake shoes disposed approximately parallel to the rail defining with the rail a brake slot into which the trolley slides. The slot is dimensioned so that the brake shoe engages a surface of the trolley during its travel along the rail, and in fact is deflected away from the rail by the trolley. The span of the shoe may have a length of a foot or more depending upon capacity of the assembly, and may be supported by a force application member connected to the span in about the middle thereof designed to resist deflection caused by the trolley and to exert a braking force against the trolley. To accommodate the trolley, the brake shoe itself must be somewhat resilient capable of deflecting, and the force applying means must be capable of some give.

Because a large amount of force usually is required to stop an overhead trolley, it is conventional practice to use a high pressure air cylinder as the force applying means, equipped with limit switches which appropriately turn the air supply on and off, jartly to save on air.

Although such a brake system has many advantages, being relatively inexpensive and effective, it has one major disadvantage, namely that the use of an air cylinder with limit switches permits the shoe to chatter against the trolley during the braking operation.

It is an object of the present invention to avoid this chatering, and to provide a brake system which is simpler in construction, more effective, and free from the maintenance requirements usually associated with a high pressure air cylinder.

In particular, it is an object of the present invention to provide a brake system which is effective with use only of a dash-pot as the force application means.

In accordance with the invention, there is provided a brake system for material handling apparatus of the type which comprises a rail and trolley means movable along the rail under the force of gravity. The brake system includes a brake contacting surface on the trolley, and at least one brake shoe supported along the rail, the shoe having a relatively long flat surface approximately parallel with the rail but spaced therefrom defining with the rail brake slot in which the brake contacting surface of the trolley slides. The brake shoe is spaced from the rail a predetermined distance designed so that the shoe is deflected by the trolley as it passes in the brake slot. A front end of the brake shoe is pivotally connected to the rail and is first contacted by the trolley. The brake shoe is connected near the opposite end with a movement multiplying linkage in turn connected to a dash-pot exerting a braking force on the brake shoe through the linkage.

Preferably, the movement multiplying linkage is connected between the brake shoe and an air-dash-pot, the linkage arms being of different lengths so that the ratio of movement of the dash-pot piston to deflection of the brake shoe is in the range of about 2:1 to about 5:1. In this way, an effective force is exerted by the dash-pot with very little movement of the brake shoe.

For purposes of this application, a dash-pot is defined as a cylinder with a piston in it. As the piston moves in the cylinder, it moves against a cushion of air, the latter being bled from the cushion side of the piston at a predetermined rate. This preferably is by an adjustable bleed valve on the cushion end of the cylinder allowing the fluid to escape. A conventional spring may be used to bring the dash-pot piston back to its original position. The rate of bleed of air from the cushion side of the cylinder is set to prevent springiness in the system or any quick, jerking mechanical motion. Although fluids other than air can be used, an air dash-pot offers the advantage that it requires little maintenance or care, and is cleans.

A dash-pot piston must move a substantial distance before a pressure can be built up on the air cushion side of the piston. The movement multiplying linkage and span of the brake shoe provides the movement with only a small initial deflection of the shoe at its pivot end.

The air bleed aspect of the dash-pot in combination with greater distance of travel of the piston of the dash-pot relative to deflection of the brake shoe effected by the force applying linkage tends to dampen any vibration or chattering in the brake shoe. In addition, resiliency in the brake shoe span between the pivoted front end of the shoe and the point at which the braking force is applied contributes towards maintaining the shoe in continuous contact with the trolley preventing chattering or vibration of the shoe.

The invention and advantages thereof will become apparent upon consideration of the following specification, with reference to the accompanying drawings, in which.

Figure 1:
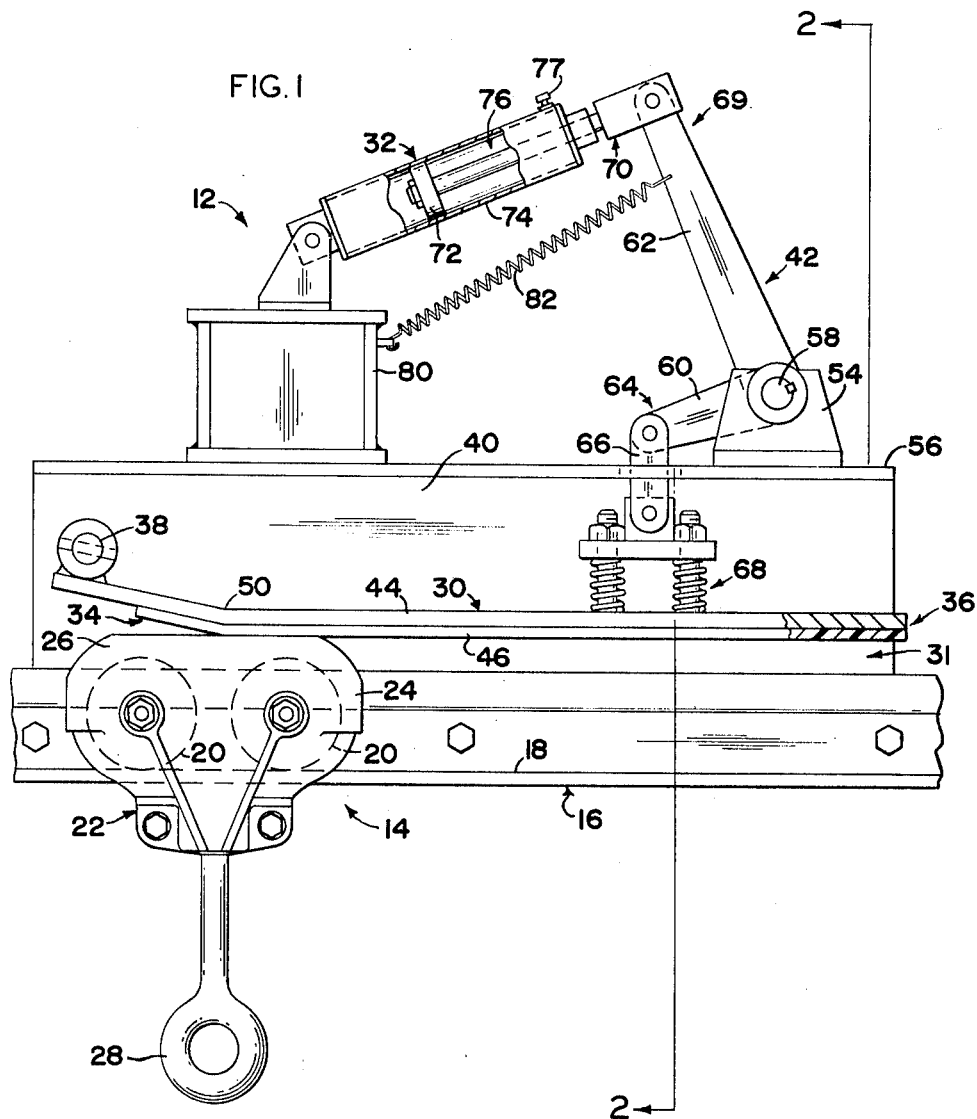
FIGURE 1 is a section elevation view of a braking system in accordance with the invention.
Figure 2:
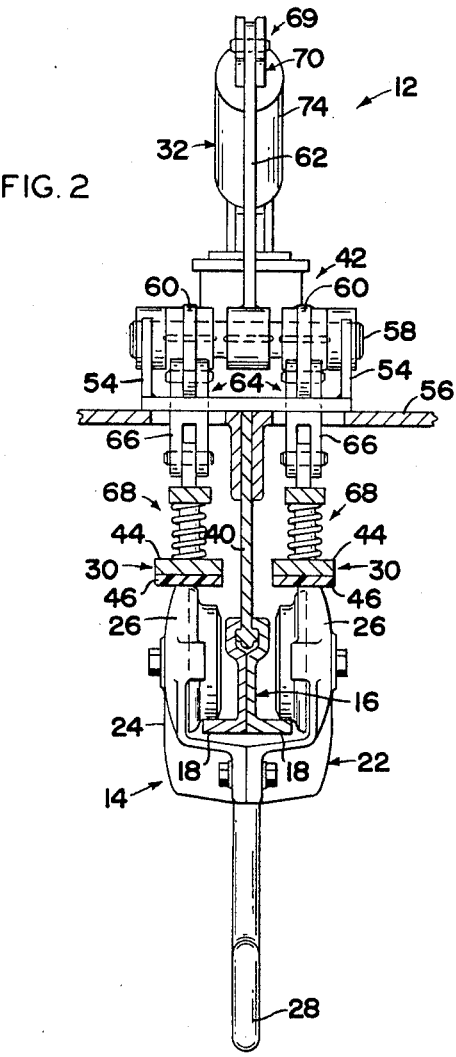
FIGURE 2 is a section front view taken along line 2—2 of FIGURE 1.

Referring to the figures, the numeral 12 designates a braking system in accordance with the invention. The system is attached to a monorail assembly broadly designated with the numeral 14 at a selected point on the latter. As an example of where the braking system of the invention may be used, a monorail track may be provided with a slope leading from a loading end at a first elevation to a discharge end at an elevation lower than the loading end. A loaded trolley rolls down the track slope and is brought to a stop by a braking system at the discharge end. It is evident that the braking system at the discharge end must be sturdy and efficient to overcome the considerable momentum and inertia in the loaded trolley arriving at the discharge end. The system also must be relatively simple in construction and thus inexpenesive to manufacture.

Although the invention shall be described with reference to a monorail assembly, it will be apparent that concepts of the invention are applicable to other overhead material handling apparatus and other conveyor arrangements wherein a braking system may be required.

In the figures, there is illustrated a rail 16 in the form of an inverted T having outwardly extending flanges 18 on which wheels 20 of a monorail trolley 22 ride. As illustrated in the figures, each trolley is provided with a U shaped housing 24 encompassing the rail 16, pairs of tandem wheels 20 being attached to each side panel 26 of the housing 24. Extending downwardly from the housing 24 is an eye or suitable hook or coupling 28 for attachment to material to be transported.

The braking system 12 has as essential components brake shoes 30 which are longitudinally extending relatively flat plates or members a foot or more in length, depending upon capacity of the assembly, having a longitudinal dimension approximately parallel to the direction of travel of the trolley 22, or parallel to the rail 18. The shoes are disposed above and spaced from the flanges 18 of rail 16 to define brake slots 31 of predetermined dimension or height to accommodate trolley 22. Each brake system comprises a pair of brake shoes, on opposite sides of the rail, contacting appropriate braking surfaces of opposite sides 26 of the trolley housing. A further essential component of the braking system is dash-pot 32 designed to exert a braking force on the brake shoes.

Each of the brake shoes has a front end or surface 34 which the trolley 22 first contacts and a trailing end 36 removed from the front end. A suitable horizontal transverse pivot pin 38 attached to the rail upstanding center hanger 40 is connected to the front end of each brake shoe providing a pivot point for the brake shoe. Adjacent the trailing end of each brake shoe, a linkage arrangement generally designated with the numeral 42 is connected between the dash-pot 32 and each brake shoe.

The body of the brake shoe preferably comprises a steel beam or back-up member of a resilient spring metal 44 and a friction surface 46 of a high friction, high wear material, such as polyurethane. At the front end 34, the brake shoe converges with the rail flanges 18 rearwardly from the pivot pin 38 to the brake slot 31, so that at the pivot point there is no contact between the suspended trolley and the brake shoe, but in the direction of the linkage 42, contact is made with the surface 34. Subsequent travel of the trolley towards the trailing end of the brake shoe requires upward deflection of the shoe to accommodate the trolley. Preferably the initial point of contact between the brake shoe and the trolley is intermediate the pivot point and point of bend 50 in the brake shoe, against the surface 46 which slopes upwardly and away from the rail flanges 18.

The linkage arrangement of the braking system comprises a pivot seat 54 which is connected to and seats along the top surface 56 of rail 16. The pivot seat accommodates a pivot pin 58, which turns therein, and which is rigidly connected to arms 60 extending approximately horizontally towards the front end 34 of the brake shoe, on opposite sides of the rail 16. Also rigidly connected to the pin 58, is upstanding arm 62 which extends upwardly from the pin, each arm 60 forming with the arm 62 a rigid L-shaped connection. The arm 62 preferably is two to five times as long as each arm 60.

For each brake shoe, the outboard end 64 of each arm 60 is connected to an intermediate link 66, which in turn is connected to a shock absorbing spring means 68, the latter two items being of suitable configuration to transmit a force between the brake shoe and the arm 60.

At the outboard end 69 of the upwardly extending second arm 62, the arm is connected to a piston means 70 of dash-pot 32. The latter provides between piston 72 and the dash-pot cylinder 74 an air cushion 76, which can be bled from the dash-pot by an adjustable air valve 77. As the brake shoe begins to deflect upwardly, the upward movement of pivot arm 60 causes an outward movement of arm 62 compressing air cushion 76 and resulting in the application of a resisting or braking force against the shoe.

Preferably, a movement of a fraction of an inch in the brake shoe results in several inches movement of the piston 72 in the dash-pot, at least two to five times the distance of upward movement of the shoe, depending upon the length ratio in arms 60 and 62. This ratio of movement tends to dampen vibration or chattering in the brake shoe.

In operation, the trolley traveling on rail 16 contacts the brake shoe along sloping surface 34 causing the brake shoe to bend upwardly away from the rail to accommodate the trolley. The sloping surface at this portion of the brake shoe exerts an immediate high braking pressure on the trolley, which decreases as the trolley moves along. However, to bring the trolley to a halt, the shoes must exert a continuous predetermined force against the trolley, and this is accomplished by adjusting the air bleed through valve 77 releasing air at a predetermined rate as the air cushion is compressed so that the braking force remains substantially constant. Maintaining such a constant force is aided by the length of the span between the pivot pin 38 and linkage 42, and a predetermined resiliency or stiffness in the shoe.

Approximately parallel to the dash-pot, connected to arm 62 and frame 80 supporting the dash-pot, is a simple tension spring 82 designed to bring the linkage and dash-pot components back to their original position following removal of the trolley from the brake slot. This return of the piston to its original position is aided by the weight of the brake system components.

Principal advantages of the invention should be apparent, namely that positioning the force applying linkage at an end of the brake shoe removed from the shoe pivot end, and designing the linkage as a movement multiplier, permits the use of a simple air dash-pot, which is free of the air supply and maintenance requirements heretofore associated with a high pressure air cylinder. The dash-pot can be used because the movement advantage gained in the brake shoe span and linkage results in the immediate application of a braking force by the dash-pot. Being able to bleed air from the dash-pot cushion side to avoid springiness prevents chattering of the shoe against the trolley heretofore experienced with an air cylinder.

Although the invention has been described with reference to specific embodiments, variations will be apparent to those skilled in the art.

What is claimed is:

1. A brake system for material handling apparatus of the type including an overhead rail, trolley means suspended from and movable along said rail, comprising:
   a brake contacting surface on said trolley means extending parallel with said rail;
   an elongated brake shoe means substantially longer than said contacting surface, said shoe means being pivotally connected to said rail at a front end thereof which first contacts said brake contacting surface, and including a longitudinal portion extending from said front end approximately parallel to said rail and spaced above adn overlying said rail;
   said shoe and rail defining a brake slot;
   movement multiplying linkage means connected to a point on said brake shoe longitudinally removed from said front end by at least a major portion of said span;
   the dimension of said brake slot being such as to result in deection of the brake shoe span away from said rail on travel of the trolley brake contacting surface in said slot;
   dash-pot means connected to said linkage means in a manner to resist deflection of said brake shoe span.

2. A system according to claim 1 wherein said brake shoe front end defines a surface which diverges outwardly from said rail to define a brake slot inlet of greater dimension that said brake slot.

3. A system according to claim 1 wherein said dash-pot includes a piston, said linkage means providing a ratio of movement of the piston relative the brake shoe in the range of about 2:1 to about 5:1.

4. A system according to claim 1 wherein said brake shoe comprises a resilient back-up member and a friction surface overlying said back-up member.

5. A system according to claim 4 wherein said friction surface is polyurethane.

6. A brake system for material handling apparatus of the type including an overhead rail, trolley means suspended from and movable along said rail, comprising a brake contacting surface for said trolley means extending parallel with said rail;

an elongated brake shoe means spaced above and overlying said rail including a front end portion and a relatively flat span portion;

means pivotally connecting said brake shoe means front end portion to said rail such that said brake contacting surface first contacts the front end portion;

movement multiplying linkage means connected to said span portion at a point removed from the front end portion whereby a major part of the span portion is between the linkage means and front end portion, said linkage means holding said span portion approximately parallel to the system rail to define therewith a brake slot;

the dimension of the brake contacting surface being greater than that of the brake slot to cause deflection of the brake shoe span portion away from the rail on travel of the brake contacting surface along the slot;

dash-pot means including a piston means connected to said linkage means in a manner to resist said deflection of the brake shoe means;

said brake shoe means comprising a resilient back-up member at least co-extensive with said span major part and a friction surface overlying said back-up member contacting said brake contacting surface;

said linkage means providing a ratio of movement of the piston means relative the brake shoe span portion in the range of about 2:1 to about 5:1.

7. A system according to claim 6 wherein said rail is in the shape of an inverted "T," said trolley means comprising brake contacting surfaces on opposite sides of said rail, said brake shoe means also being disposed on opposite sides of said rail.

8. A system according to claim 7 wherein the fluid in said dash-pot means is air, said dash-pot means including an air bleed valve on the cushion end thereof, spring means to return said dash-pot piston means to its original position on removal of said trolley means from said brake slot.

References Cited

UNITED STATES PATENTS

| | | | |
|---|---|---|---|
| 1,386,496 | 8/1921 | Hassler | 104—894 XR |
| 1,959,468 | 5/1934 | Frost et al. | 188—62 X |
| 2,728,538 | 12/1955 | Mazis | 188—624 XR |
| 2,844,105 | 7/1958 | King | 104—249 X |
| 3,085,659 | 4/1963 | Ashmead | 188—42 |
| 3,154,203 | 10/1964 | Barry | 104—89 X |
| 3,163,260 | 12/1964 | Brenner | 188—57 X |

GEORGE E. A. HALVOSA, Primary Examiner

U.S. Cl. X.R.

104—249